United States Patent
Gao et al.

(10) Patent No.: US 8,914,816 B2
(45) Date of Patent: Dec. 16, 2014

(54) CD PLAYER AND METHOD FOR EJECTION CONTROL THEREOF

(71) Applicant: MediaTek Singapore Pte. Ltd., Singapore (SG)

(72) Inventors: Yifan Gao, Hefei (CN); Wei-Sheng Huang, Huwei Township, Yunlin County (TW); Ming-Tsang Wu, Jhubei (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/014,978

(22) Filed: Aug. 30, 2013

(65) Prior Publication Data

US 2014/0068640 A1    Mar. 6, 2014

(30) Foreign Application Priority Data

Aug. 31, 2012   (CN) .......................... 2012 1 0319165

(51) Int. Cl.
G11B 19/10 (2006.01)
G11B 17/056 (2006.01)
G11B 17/04 (2006.01)

(52) U.S. Cl.
CPC ................................ G11B 17/056 (2013.01)
USPC ..... 720/602; 720/601; 369/30.27; 369/30.36; 369/53.41

(58) Field of Classification Search
USPC ........ 369/30.27, 30.36, 53.41; 720/602, 601, 720/606
See application file for complete search history.

(56) References Cited

U.S. PATENT DOCUMENTS 8,060,894 B2 * 11/2011 Nakagawa ..................... 720/602
2003/0223323 A1 * 12/2003 Osawa ........................ 369/30.36

* cited by examiner

*Primary Examiner* — Will J Klimowicz
(74) *Attorney, Agent, or Firm* — McClure, Qualey & Rodack, LLP

(57) ABSTRACT

A compact disc (CD) player and method for ejection control thereof is provided. The CD player has: a CD tray, an eject button, a front-end module, a back-end module, and a fast response eject module, wherein the front-end module and the back-end module are coupled to each other and integrated in an integrated circuit (IC). The fast response eject module has a second tray control module for detecting a status of the eject button, and a second ejection detection module for controlling the ejecting/inserting of the CD tray according to the detected status of the eject button after the CD player is powered up and before initialization of the first ejection detection module is completed. Accordingly, the CD player of the invention may quickly respond to the status of the eject button and control ejecting/inserting of the CD tray immediately after the CD player is powered up.

14 Claims, 5 Drawing Sheets

CD PLAYER AND METHOD FOR EJECTION CONTROL THEREOF

CROSS REFERENCE TO RELATED APPLICATIONS

This application claims priority of China Patent Application No. 201210319165.6, filed on Aug. 31, 2012, the entirety of which is incorporated by reference herein.

BACKGROUND OF THE INVENTION

1. Field of the Invention

The present invention relates to a CD player and a method for ejection control thereof, and in particular, to a system-on-chip and method for ejection control of a CD player.

2. Description of the Related Art

With advances in technologies, miniaturization of CD players has become more and more popular. In order to achieve miniaturization of CD players, research developers usually integrate the front-end module and the back-end module into an integrated circuit (IC), thereby building a system-on-chip. Specifically, the front-end module is responsible for controlling the ejecting and inserting of the tray, so that a CD can be inserted into or ejected from the CD player. In addition, the front-end module retrieves analog signals from the CD, converts the retrieved analog signals into digital signals by parameter transformation, and performs a first decoding on the digital signals, thereby decoding CD data of different types into intermediate data of a single format. The back-end module is responsible for detecting the status of the eject button and performing a second decoding process on the intermediate data, thereby obtaining audio/video signals recognized by the CD player.

Note that it is understood, that the front-end module cannot enter the working state until initialization of a bootloader program is completed (i.e. after the settings of the initial screen are completed by the back-end module when an initial screen is being displayed). Accordingly, the front-end module has to wait for a time period to control the ejecting and inserting of the CD tray after being powered up. Moreover, since the back-end module has more functions than the front-end module, the initialization time of the back-end module is much longer than that of the front-end module. Thus, the CD player cannot eject or insert the CD tray even though the front-end module is ready for controlling the ejecting/inserting of the CD tray, while the back-end module is initializing the ejection detection module capable of detecting the status of the eject button. Therefore, the duration, for the CD player to be ready to eject/insert the CD-tray after being powered up, is about 3 seconds.

BRIEF SUMMARY OF THE INVENTION

A detailed description is given in the following embodiments with reference to the accompanying drawings.

In view of the above, a CD player and method for ejection control thereof is provided, thereby quickly performing an ejection function of the CD player having the system-on-chip when the CD-player is powered up.

In an exemplary embodiment, a compact disc (CD) player is provided. The CD player comprises: a CD tray; an eject button; a front-end module, comprising a first tray control module coupled to the CD tray; a back-end module, coupled to the front-end module, wherein the back-end module comprises a first ejection detection module coupled to the eject button, and the front-end module and the back-end module are integrated in an integrated circuit (IC); and a fast response eject module, comprising: a second tray control module, coupled to the CD tray; and a second ejection detection module, coupled to the eject button and the first ejection detection module, wherein the second ejection detection module detects a status of the eject button and the second tray control module controls ejecting/inserting of the CD tray according to the detected status of the eject button during a time period after the CD player is powered up and before initialization of the first ejection detection module is completed.

In the first exemplary embodiment, the fast response eject module is integrated in the back-end module, wherein the fast response eject module is configured to start detecting the status of the eject button after the back-end module is powered up.

In the first exemplary embodiment, the fast response eject module is integrated in the IC, and is disposed on the outside of the back-end module.

In the first exemplary embodiment, the fast response eject module is implemented by a segment of program codes, a physical circuit, or firmware.

In the first exemplary embodiment, initialization time of the fast response eject module is within 100 milliseconds.

In the first exemplary embodiment, the second ejection detection module of the fast response eject module further stops the detecting of the status of the eject button after initialization of the first ejection detection module is completed.

In the first exemplary embodiment, the second tray control module further stops the controlling of the ejecting/inserting of the CD tray after initialization of the first tray control module is completed.

In a second exemplary embodiment, a method for ejection control in a CD player is provided. The CD player comprises: a CD tray, an eject button, a front-end module and a back-end module coupled with each other, wherein the front-end module comprises a first tray control module coupled to the CD tray, the back-end module comprises a first ejection detection module coupled to the eject button, and the front-end module and the back-end module are integrated in an integrated circuit (IC). The CD player further comprises a fast response eject module having a second tray control module and a second ejection detection module, wherein the second tray control module is coupled to the CD tray, and the second ejection detection module is coupled to the eject button and the first ejection detection module. The method comprises: initializing the fast response eject module after the CD player is powered up; detecting a status of the eject button via the second ejection detection module before initialization of the first ejection detection module of the back-end module is completed; and controlling the ejecting/inserting of the CD tray via the second tray control module according to the detected status of the eject button.

In the second exemplary embodiment, the fast response eject module is integrated in the back-end module, and the method further comprises starting the detecting of the status of the eject button after the back-end module is powered up.

In the second exemplary embodiment, the fast response module is integrated in the same IC, and is disposed on the outside of the back-end module.

In the second exemplary embodiment, the fast response eject module is implemented by a segment of program codes, a physical circuit, or firmware.

In the second exemplary embodiment, the method further comprises determining whether initialization of the first ejection detection module of the back-end module is completed, and stopping the detecting of the status of the eject button via the second ejection detection module after initialization of the first ejection detection module of the back-end module is completed.

In the second exemplary embodiment, the method further comprises determining whether initialization of the first tray control module of the front-end module is completed, and stopping the controlling of the ejecting/inserting of the CD tray via the second tray control module after initialization of the first tray control module is completed.

In the second exemplary embodiment, the step of stopping the detecting of the status of the eject button via the second ejection detection module further comprises notifying the first ejection detection module to stop the detecting of the status of the eject button via the second ejection detection module.

By using the fast response eject module, the CD player having the system-on-chip and the method for ejection control thereof may perform the ejecting/inserting functions quickly after the CD player is powered up, thereby increasing convenience of usage.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
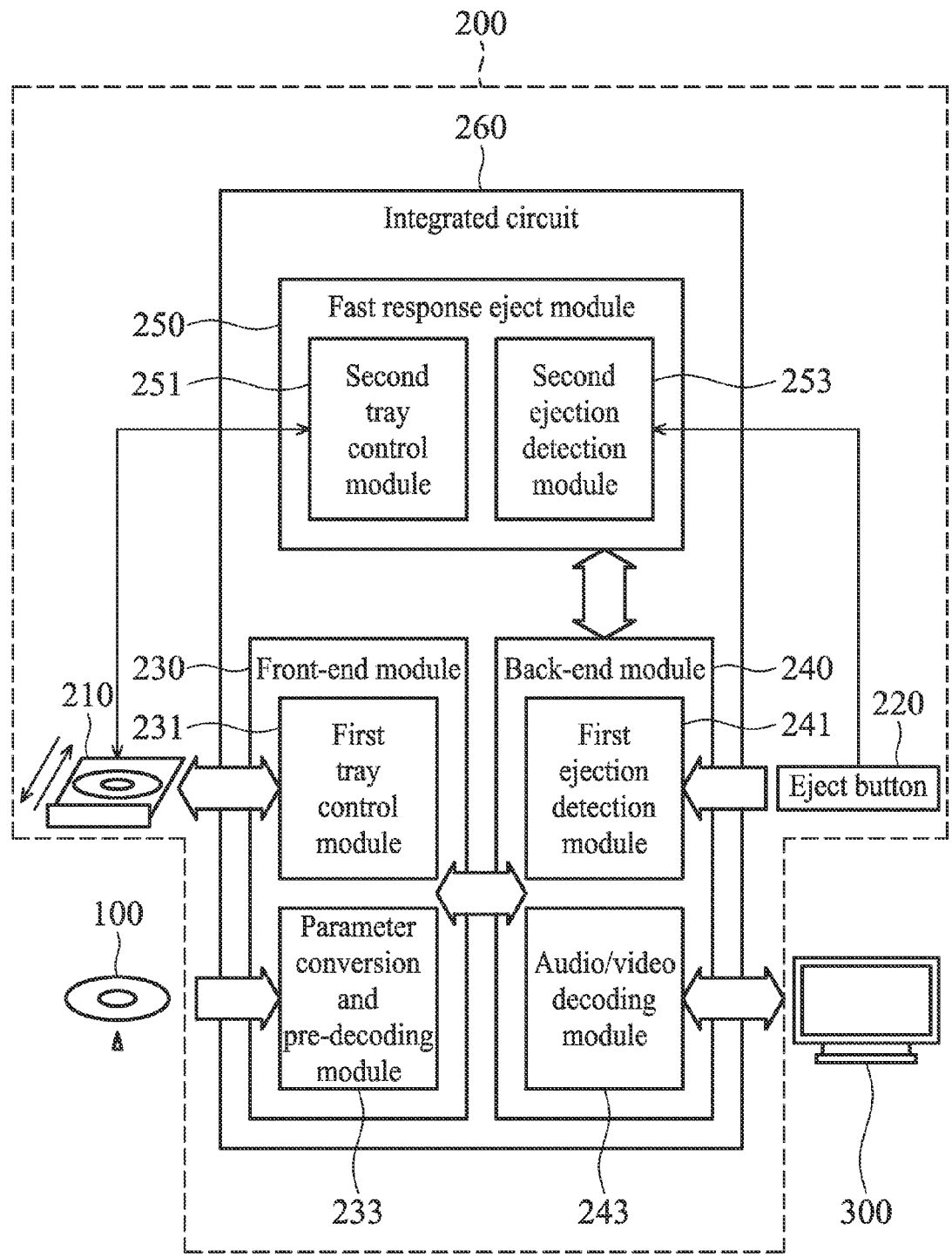
FIG. 1 is a structure diagram of a CD player according to an embodiment of the invention.

FIG. 1 is a structure diagram of a CD player according to an embodiment of the invention. Referring to FIG. 1, the CD player 200 includes a CD-tray 210, an eject button 220, a front-end module 230, a back-end module 240, and a fast response eject module (hereafter as FREM) 250. The front-end module 230 includes a first tray control module 231, and a parameter conversion and pre-decoding module 233. The back-end module 240 includes a first ejection detection module 241 and an audio/video decoding module 243. The FREM 250 includes a second tray control module 251 and a second ejection detection module 253. In the embodiment, the FREM 250 is disposed on the outside of the back-end module 240. Further, the front-end module 230, the back-end module 240, and the FREM 250 are integrated on the same integrated circuit (IC) 260, wherein the front-end module 230 and the FREM 250 are coupled to the back-end module 240, respectively.

The CD tray 210 is configured to support a CD 100, and the first tray control module 231 of the front-end module 230 is coupled to the CD tray 210. The parameter conversion and pre-decoding module 233 of the front-end module 230 is configured to receive the analog signals retrieved from the CD 100, convert the analog signals into digital signals, and perform a first decoding process on the digital signals, thereby decoding the CD data of different types into intermediate data of a same format. The first ejection detection module 241 of the back-end module 240 is coupled to the eject button 220. The audio/video decoding module 243 of the back-end module 240, which is coupled to the parameter conversion and pre-decoding module 233 and a display device 300 (e.g. a digital TV), is configured to decode the intermediate data, which are from the parameter conversion and pre-decoding module 233, into original audio/video data, which are further transmitted to the display device 300. The second tray control module of the FREM 250 is coupled to the CD tray 210. The second ejection detection module 253 of the FREM 250 is coupled to the eject button 220 and the first ejection detection module 241.

When the CD player 200 is powered up, since the FREM 250 is disposed on the outside of the back-end module 240, the back-end module 240 and the FREM 250 can be powered up simultaneously. Accordingly, the back-end module 240 and the FREM 250 can be initialized simultaneously. In addition, because there are only a few functions integrated in the FREM 250, the FREM 250 can be initialized within a very short time to enter the working state. Generally, the initialization time of the FREM 250 is less than 100 ms. When the FREM 250 is initialized, the back-end module 240 has not been initialized yet. The initialization of the first ejection detection module 241 can not be completed until initialization of the bootloader program is completed (i.e. after the settings of the initial screen are completed by the back-end module 241 when an initial screen is being displayed). Generally, it may take 3 seconds for the CD player 200 from being powered up to the first ejection detection module 241 being completely initialized. For one having ordinary skill in the art, it is appreciated that the first ejection detection module 241 may only detect the status of the eject button 220 after the first ejection detection module 241 of the back-end module 240 has been completely initialized, and the first tray control module 231 may only control the ejecting/inserting of the CD tray 210 after the first tray control module 231 of the front-end module 230 has been completely initialized.

In the embodiment, upon powering up of the CD player 200, the second try detection module 253 of the FREM 250 may detect the status of the eject button 220 before the first ejection detection module 241 of the back-end module 240 is completely initialized. If the status of the eject button 220 is "inserted", the second ejection detection module 253 may notify the second tray control module 251 to control the CD tray 210 to enter the cabinet of the CD player 200 according to the status of the eject button 220 detected by the second ejection detection module 253. If the status of the eject button 220 is "ejected", the second ejection detection module 253 may notify the second tray control module 251 to control the CD tray 210 to eject from the cabinet of the CD player 200 according to the status of the eject button 220 detected by the second ejection detection module 253.

When the FREM 250 detects that the initialization of the first ejection detection module 241 of the back-end module 240 has been completed or when the first ejection detection module 241 of the back-end module 240 notifies the FREM 250 of the completion of initialization, the second ejection detection module 253 may stop the detecting of the status of the eject button 220. Thus, the second tray control module 251 does not control the CD tray 210 without receiving the status of the eject button 220. After the second ejection detection module 253 has stopped the status of the eject button 220, the second ejection detection module 253 may notify the first ejection detection module 241 to detect the status of the eject button 220 for the second ejection detection module 253. Similarly, after initialization of the first tray control module 231 has completed and when the status of the eject button 220 detected by the ejection detection module 241 is "inserted", the first tray control module 231 may control the CD tray 210 to enter the cabinet according to the status of the eject button 220 detected by the first ejection detection module 241. After initialization of the first tray control 231 is completed and when the status of the eject button 220 detected by the first ejection detection button 241 is "ejected", the first tray control module 231 may control the CD tray to eject from the cabinet of the CD player 200 according to the status of the eject button 220 detected by the first ejection detection module 241.

It should be noted that the FREM 250 can be implemented by a segment of program codes, a physical circuit, or firmware.

Figure 2:
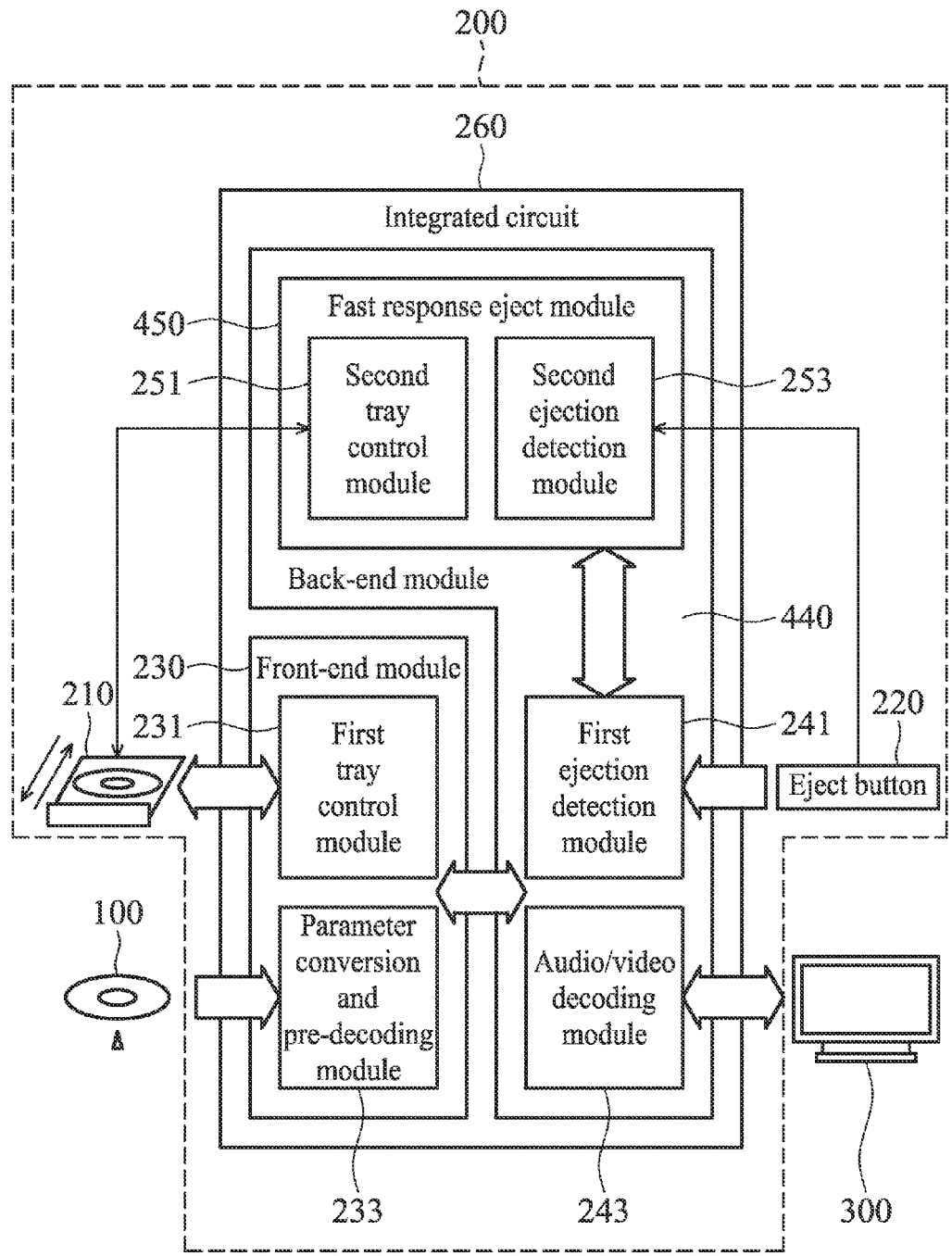
FIG. 2 is a structure diagram of the CD player according to another embodiment of the invention.

FIG. 2 is a structure diagram of the CD player according to another embodiment of the invention. Referring to FIG. 2, the differences between the CD players in FIG. 2 and FIG. 1 are: (1) the FREM 450 is disposed on the inside of the back-end module 440; and (2) the FREM 450 starts the detecting of the status of the eject button 220 after the back-end module 440 is powered up.

Figure 3:
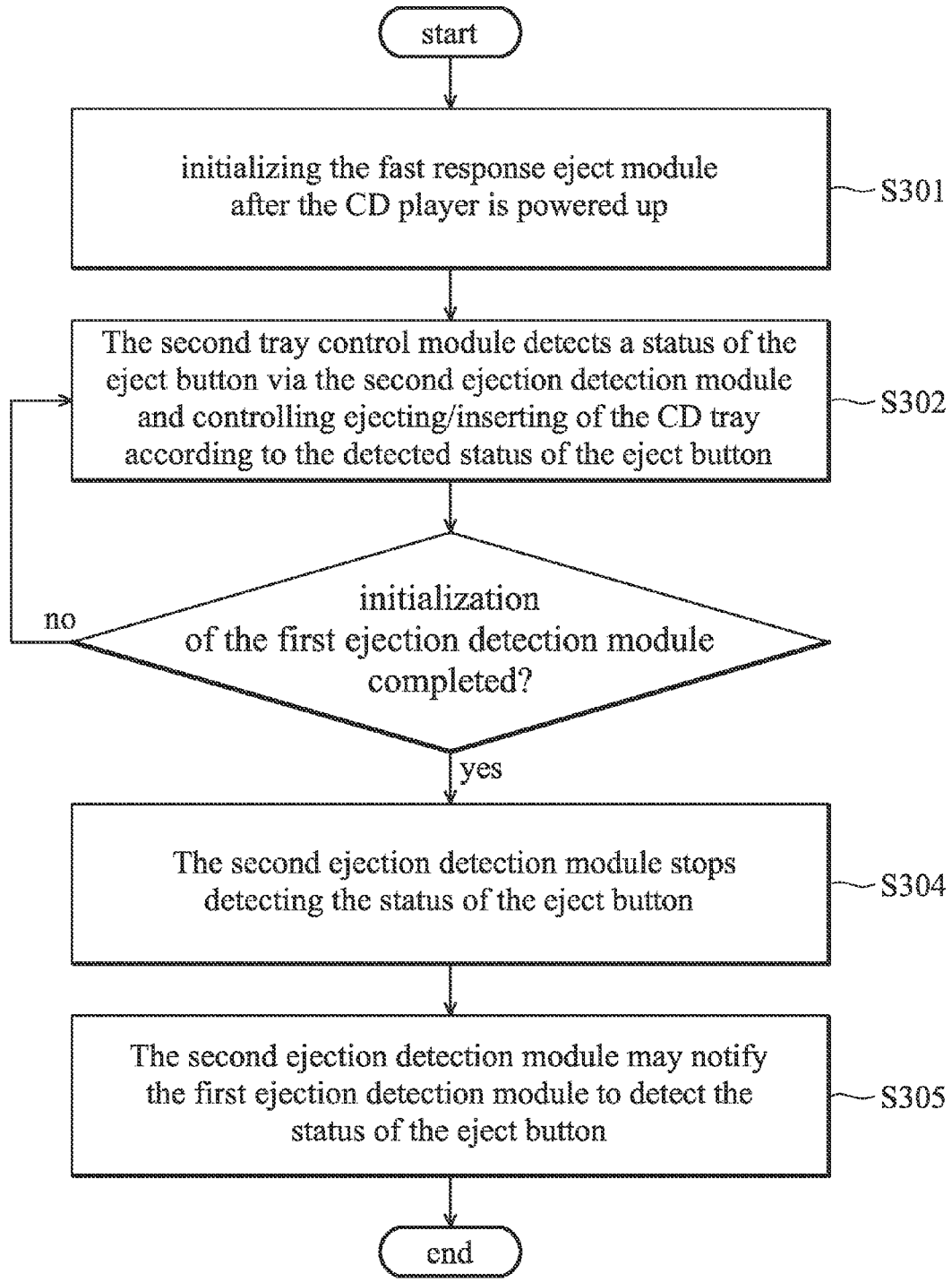
FIG. 3 is a flow chart of a method of ejection control in a CD player according to an embodiment of the invention.

FIG. 3 is a flow chart of a method of ejection control in a CD player according to an embodiment of the invention. The CD player in FIG. 1 or FIG. 2 can be used to implement the ejection control method in FIG. 3. For ease of description, for example, the CD player may comprise: a CD tray, an eject button, a front-end module and a back-end module coupled with each other. The front-end module may comprise a first tray control module which is coupled to the CD tray, and the back-end module may comprise a first ejection detection module which is coupled to the eject button. In addition, the front-end module and the back-end module are integrated in an integrated circuit (IC). Additionally, the CD player may further comprise a fast response eject module, which comprises a second tray control module and a second ejection detection module. The second tray control module is coupled to the CD tray, and the second ejection detection module is coupled to the eject button and the first ejection detection module.

In the embodiment, the method for ejection control in a CD player may comprise the following steps:

S301: The FREM is initialized after the CD player is powered up. After the CD player is powered up, if the FREM is integrated in the back-end module, the FREM can be initialized after the back-end module is powered up. If the FREM is disposed on the inside of the back-end module and is integrated in the same IC, the FREM can be initialized after the CD player is powered up. Since there are only a few functions integrated in the FREM, the initialization of the FREM can be completed within less than 100 milliseconds. When the initialization of the FREM is completed, the back-end module is still performing the initialization process. The initialization of the first ejection detection module can not be completed until initialization of the bootloader program is completed (i.e. after the settings of the initial screen are completed by the back-end module 241 when an initial screen is being displayed). Generally, it may take 3 seconds for the CD player from being powered up to the first ejection detection module being completely initialized.

S302: Before initialization of the first ejection detection module of the back-end module is completed, the second ejection detection module may detect the status of the eject button, and the second tray control module may control the ejecting/inserting of the CD tray according to the detected status of the eject button.

Before initialization of the first ejection detection module of the back-end module is completed, the second ejection detection module of the FREM may detect the status of the eject button. If the detected status of the eject button is "inserted", the second ejection detection module may notify the second tray control module to control the CD tray to enter the cabinet of the CD player according to the detected status of the eject button. If the detected status of the eject button is "ejected", the second ejection detection module may notify the second tray control module to control the CD tray to eject from the cabinet of the CD player according to the detected status of the eject button.

S303: It is determined whether initialization of the first ejection detection module has been completed. If the initialization of the first ejection detection module of the back-end module has not been completed yet, step S302 is performed. If the initialization of the first ejection detection module of the back-end module has been completed, step S304 is performed.

S304: The second ejection detection module stops the detecting of the status of the eject button. When it is determined that the initialization of the first ejection detection module has completed, the first ejection detection module may notify the second ejection detection module to stop the detecting of the status of the eject button, so that the second tray control module does not obtain the status of the eject button from the second ejection detection module. Accordingly, the second tray control module no longer controls the CD tray.

S305: The second ejection detection module may notify the first ejection detection module to detect the status of the eject button.

After the second ejection detection module has stopped the detecting of the status of the eject button, the second ejection detection module may notify the first ejection detection module to detect the status of the eject button. In other words, the first ejection detection module may detect the status of the eject button in replacement of the second ejection detection module. After initialization of the first tray control module has been completed and the status of the eject button detected by the first ejection detection module is "inserted", the first tray control module may control the CD tray to enter the cabinet of the CD player according to the status of the eject button detected by the first ejection detection module. After initialization of the first tray control module has been completed and the status of the eject button detected by the first ejection detection module is "ejected", the first tray control module may control the CD tray to eject from the cabinet of the CD player according to the status of the eject button detected by the first ejection detection module.

Figure 4:
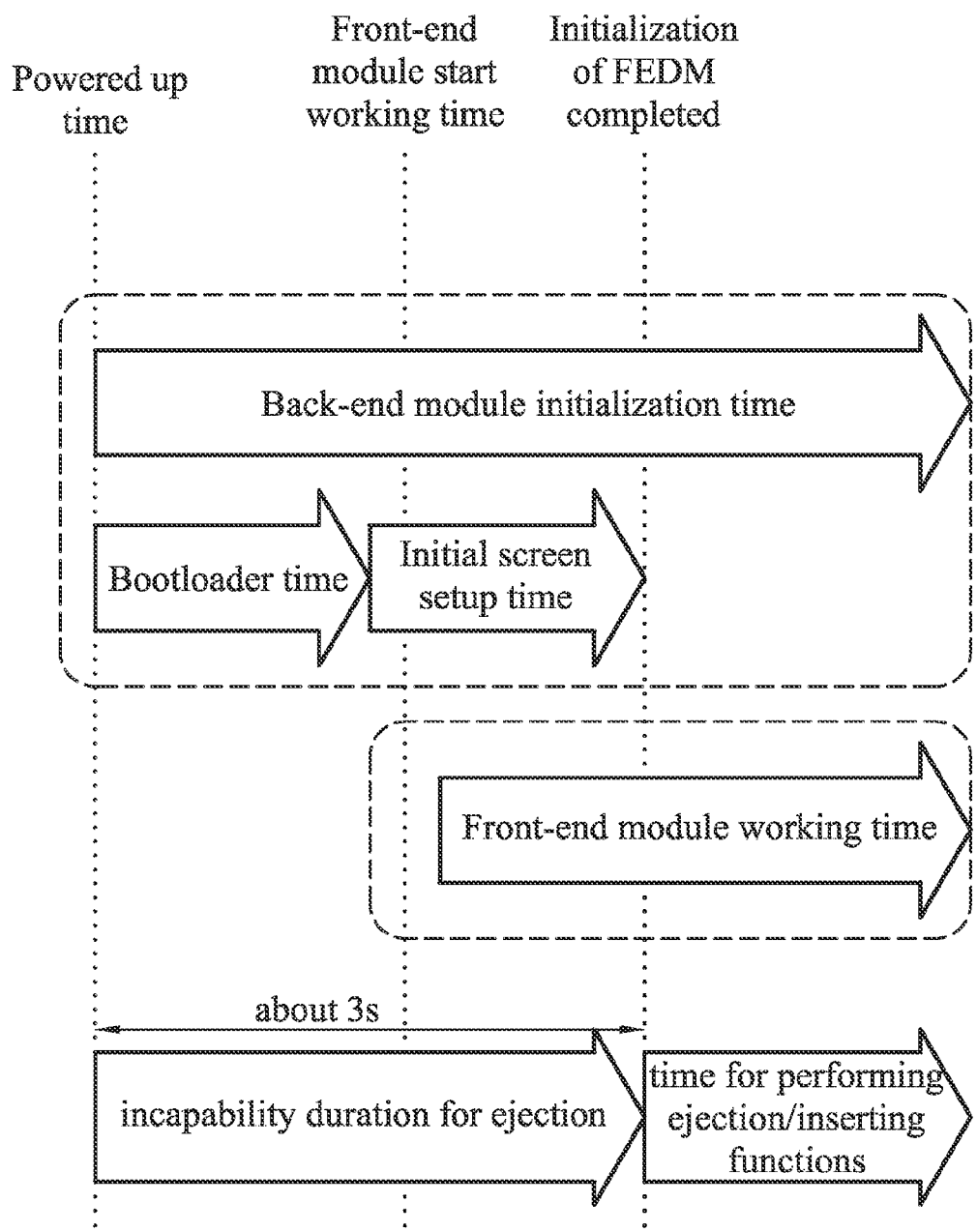
FIG. 4 is a timing diagram of the response of the eject button in conventional techniques.
Figure 5:
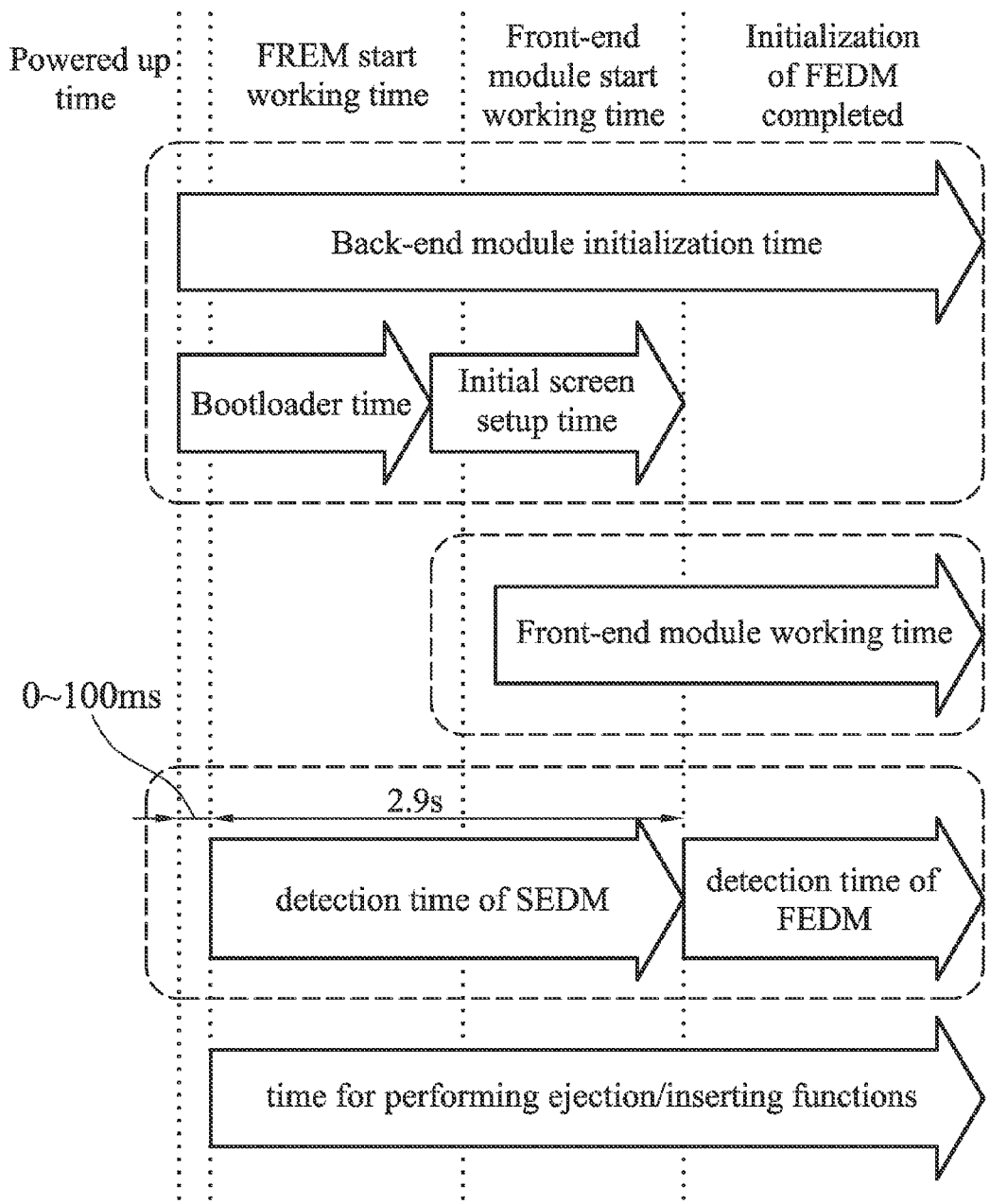
FIG. 5 is a timing diagram of the response of the eject button according to an embodiment of the invention.

FIG. 4 is a timing diagram of the response of the eject button in conventional techniques. FIG. 5 is a timing diagram of the response of the eject button according to an embodiment of the invention.

Referring to FIG. 4, even though the front-end module starts to work, the back-end module cannot respond to the eject button until the bootloader program is activated and the initial screen is set (i.e. the moment when initialization of the first ejection detection module (FEDM) is completed) in conventional techniques. Accordingly, a conventional CD player having a system-on-chip cannot execute the ejecting/inserting functions for about 3 seconds from the moment when the conventional CD player is powered till initialization of the first ejection detection module is completed.

Referring to FIG. 4 and FIG. 5, it is appreciated that the FREM of the invention, as illustrated in FIG. 5, may be completely initialized and enter the working state within 100 milliseconds after the CD player is powered up, thereby immediately starting the detecting of the status of the eject button. In addition, after initialization of the first ejection detection module of the back-end module is completed, the first ejection detection module (FEDM) may detect the status of the eject button in replacement of the second ejection detection module (SEDM). Accordingly, the CD player of the invention may perform the inserting/ejecting functions within 100 milliseconds. In other words, comparing with conventional techniques, the CD player of the invention can save 2.9 seconds, thereby increasing user experience significantly.

In the invention, the FREM having a second ejection detection module and a second tray control module is deployed in the CD player, so that initialization of the FREM can be completed quickly after the CD player is powered up, thereby detecting the status of the eject button and control ejecting/inserting of the CD tray according to the detected status of the eject button. After initialization of the back-end module is completed, the controlling of the detecting of the status of the eject button and ejecting/inserting of the CD tray can be handed back to the front-end module and the back-end module, so that the CD player having the system-on-chip may perform the ejecting/inserting functions quickly after the CD player is powered up, thereby increasing convenience of usage.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A compact disc (CD) player, comprises:
   a CD tray;
   an eject button;
   a front-end module, comprising a first tray control module coupled to the CD tray;
   a back-end module, coupled to the front-end module, wherein the back-end module comprises a first ejection detection module coupled to the eject button, and the front-end module and the back-end module are integrated on an integrated circuit (IC); and
   a fast response eject module, comprising:
      a second tray control module, coupled to the CD tray; and
      a second ejection detection module, coupled to the eject button and the first ejection detection module,
   wherein the second ejection detection module detects a status of the eject button and the second tray control module controls ejecting/inserting of the CD tray according to the detected status of the eject button during a time period after the CD player is powered up and before initialization of the first ejection detection module is completed.

2. The CD player as claimed in claim 1, wherein the fast response eject module is integrated in the back-end module, and the fast response eject module is configured to start detecting the status of the eject button after the back-end module is powered up.

3. The CD player as claimed in claim 1, wherein the fast response eject module is integrated on the IC and disposed on the outside of the back-end module.

4. The CD player as claimed in claim 1, wherein the fast response eject module is implemented by a segment of program codes, a physical circuit, or firmware.

5. The CD player as claimed in claim 1, wherein initialization time of the fast response eject module is within 100 milliseconds.

6. The CD player as claimed in claim 1, the second ejection detection module of the fast response eject module is further configured to stop detecting the status of the eject button after initialization of the first ejection detection module is completed.

7. The CD player as claimed in claim 6, the second tray control module is further configured to stop the controlling of the ejecting/inserting of the CD tray after initialization of the first tray control module is completed.

8. A method for ejection control of a compact disc (CD) player, the CD player comprises: a CD tray, an eject button, a front-end module and a back-end module coupled with each other, wherein the front-end module comprises a first tray control module coupled to the CD tray, the back-end module comprises a first ejection detection module coupled to the eject button, wherein the front-end module and the back-end module are integrated on an integrated circuit (IC), and the CD player further comprises a fast response eject module having a second tray control module and a second ejection detection module, wherein the second tray control module is coupled to the CD tray, and the second ejection detection module is coupled to the eject button and the first ejection detection module, the method comprising:
   initializing the fast response eject module after the CD player is powered up;
   detecting a status of the eject button via the second ejection detection module before initialization of the first ejection detection module of the back-end module is completed; and
   controlling ejecting/inserting of the CD tray via the second tray control module according to the detected status of the eject button.

9. The method as claimed in claim 8, wherein the fast response eject module is integrated in the back-end module, and the method further comprises:
   starting detecting the status of the eject button after the back-end module is powered up.

10. The method as claimed in claim 8, wherein the fast response eject module is integrated on the IC and disposed on the outside of the back-end module.

11. The method as claimed in claim 8, wherein the fast response eject module is implemented by a segment of program codes, a physical circuit, or firmware.

12. The method as claimed in claim 8, further comprises:
   determining whether initialization of the first ejection detection module of the back-end module is completed; and
   stopping detecting the status of the eject button via the second ejection detection module after initialization of the first ejection detection module of the back-end module is completed.

13. The method as claimed in claim 12, further comprises:
   determining whether initialization of the first tray control module of the front-end module is completed; and
   stopping the controlling of the ejecting/inserting of the CD tray via the second tray control module after initialization of the first tray control module is completed.

14. The method as claimed in claim 12, wherein the step of stopping detecting the status of the eject button via the second ejection detection module further comprises:

notifying the second ejection detection module to stop detecting the status of the eject button via the first ejection detection module.

* * * * *